(12) United States Patent
Wu et al.

(10) Patent No.: US 12,200,797 B2
(45) Date of Patent: Jan. 14, 2025

(54) METHOD AND APPARATUS FOR TRANSMITTING RADIO LINK INFORMATION

(71) Applicant: LENOVO (BEIJING) LIMITED, Beijing (CN)

(72) Inventors: Lianhai Wu, Beijing (CN); Jing Han, Beijing (CN); Haiming Wang, Beijing (CN); Jie Shi, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 379 days.

(21) Appl. No.: 17/598,056

(22) PCT Filed: Mar. 28, 2019

(86) PCT No.: PCT/CN2019/080161
§ 371 (c)(1),
(2) Date: Sep. 24, 2021

(87) PCT Pub. No.: WO2020/191728
PCT Pub. Date: Oct. 1, 2020

(65) Prior Publication Data
US 2022/0191960 A1  Jun. 16, 2022

(51) Int. Cl.
*H04W 76/19* (2018.01)
(52) U.S. Cl.
CPC ................... *H04W 76/19* (2018.02)
(58) Field of Classification Search
None
See application file for complete search history.

(56) References Cited

U.S. PATENT DOCUMENTS

| | | | | |
|---|---|---|---|---|
| 10,863,571 | B2* | 12/2020 | Cirik | H04W 76/19 |
| 2010/0202343 | A1* | 8/2010 | Hunzinger | H04W 36/18 370/328 |
| 2012/0207079 | A1* | 8/2012 | Wang | H04W 28/0284 370/315 |
| 2012/0294179 | A1* | 11/2012 | Tafreshi | H04W 36/18 370/252 |
| 2013/0279364 | A1* | 10/2013 | Nagata | H04B 7/155 370/252 |
| 2014/0105046 | A1* | 4/2014 | Tellado | H04W 24/08 370/252 |
| 2015/0011158 | A1* | 1/2015 | Luo | H04W 16/26 455/11.1 |
| 2015/0237568 | A1* | 8/2015 | Park | H04W 48/14 370/338 |

(Continued)

FOREIGN PATENT DOCUMENTS

WO  2019027679 A1  2/2019

OTHER PUBLICATIONS

AT&T, Summary of 7.7.1 Enhancements to support NR backhaul links, 3GPP TSG RAN WG1 Meetin #93, R1-1807703, May 21-25, 2018, pp. 1-19, Busan, Korea.

(Continued)

*Primary Examiner* — Phirin Sam
(74) *Attorney, Agent, or Firm* — Kunzler Bean & Adamson

(57) ABSTRACT

The present disclosure relates to methods and apparatuses. According to some embodiments of the disclosure, a method includes: transmitting radio link information, wherein the radio link information is associated with a backhaul link.

20 Claims, 8 Drawing Sheets

(56) References Cited

U.S. PATENT DOCUMENTS

| | | | |
|---|---|---|---|
| 2018/0054757 A1* | 2/2018 | Nanri | H04L 1/00 |
| 2019/0124562 A1* | 4/2019 | Sartori | H04W 36/10 |
| 2021/0076368 A1* | 3/2021 | Malkamäki | H04W 76/12 |
| 2022/0039188 A1* | 2/2022 | Ishii | H04W 76/19 |
| 2022/0095410 A1* | 3/2022 | Shih | H04W 76/27 |
| 2022/0225165 A1* | 7/2022 | Park | H04W 28/06 |
| 2022/0286929 A1* | 9/2022 | Park | H04W 36/08 |
| 2023/0041940 A1* | 2/2023 | Park | H04W 72/20 |

OTHER PUBLICATIONS

International Searching Authority, "Written Opinion of the International Searching Authority," PCT/CN2019/080161, Dec. 23, 2019, pp. 1-4.

Intel Corporation, PHY layer enhancements for NR IAB, 3GPP TSG RAN WG1 Meeting #94bis, R1-1810770, Oct. 8-Oct. 12, 2018, pp. 1-13, Chengdu, China.

Sharp, Downstream notification of BH RLF in architecture 1a, 3GPP TSG RAN WG2 Meeting #105, R1-1901717, Feb. 25-Mar. 1, 2019, pp. 1-3, Athens, Greece.

Ericsson, Handling of link failures in IAB networks, 3GPP TSG-RAN WG2 #105, R1-1901386, Mar. 1-25, 2019, pp. 1-3, Athens, Greece.

Qualcomm Incorporated, Backhaul RLF notification for IAB, 3GPP TSG-RAN WG2 Meeting #105, R2-1900812, Feb. 15-Mar. 1, 2019, pp. 1-3, Athens, Greece.

* cited by examiner

500A

METHOD AND APPARATUS FOR TRANSMITTING RADIO LINK INFORMATION

TECHNICAL FIELD

The present disclosure generally relates to wireless communication technology, and more particularly radio link information transmission in a wireless communication system.

BACKGROUND

A wireless communication system may include a base station (hereinafter referred to as "BS") which is in communication with a user equipment (hereinafter referred to as "UE"). UE may include a mobile device (e.g., a cell phone, a tablet, a laptop, an internet-of-things (IoT) device, etc.). Quality of a communication link or channel between a BS and a UE may deteriorate due to various factors, for example but is not limited to, blockage by building(s), relatively long distance between the BS and the UE, etc. One of several solutions to resolve this problem may include deployment of relay nodes (hereinafter referred to as "RNs") in the wireless communication system to enhance and/or expand coverage of the BS, as disclosed in the 3rd Generation Partnership Project (3GPP).

A BS, which communicates with a UE through one or more RNs, can be called as a donor BS. These RNs together with the donor BS may form a backhaul link allowing the UE to reach the donor BS through one or more RNs. Signals from the UE may also be simply transmitted from one RN directly to the donor BS. An Integrated Access and Backhaul (hereinafter referred to as "IAB") architecture, which may be evolved from RNs deployment in 3GPP, is being developed to support multi-hop relay in a New Radio (NR) communication network.

Nevertheless, the backhaul link may fail in certain conditions, and therefore a new solution is required to transmit the radio link status.

SUMMARY OF THE DISCLOSURE

An embodiment of the present disclosure provides a method, including: transmitting radio link information, wherein the radio link information is associated with a backhaul link.

Another embodiment of the present disclosure provides a method, including: receiving, at an integrated access and backhaul node, radio link information, which is associated with a backhaul link.

Yet another embodiment of the present disclosure provides an apparatus. According to an embodiment of the present disclosure, the apparatus includes: at least one non-transitory computer-readable medium having computer executable instructions stored therein; at least one receiving circuitry; at least one transmitting circuitry; and at least one processor coupled to the at least one non-transitory computer-readable medium, the at least one receiving circuitry and the at least one transmitting circuitry, wherein the at least one non-transitory computer-readable medium and the computer executable instructions are configured to, with the at least one processor, cause the apparatus to perform a method according to an embodiment of the present disclosure.

BRIEF DESCRIPTION OF THE DRAWINGS

In order to describe the manner in which advantages and features of the disclosure can be obtained, a description of the disclosure is rendered by reference to specific embodiments thereof, which are illustrated in the appended drawings. These drawings depict only exemplary embodiments of the disclosure and are not therefore to be considered limiting of its scope.

DETAILED DESCRIPTION

The detailed description of the appended drawings is intended as a description of preferred embodiments of the present disclosure and is not intended to represent the only form in which the present disclosure may be practiced. It should be understood that the same or equivalent functions may be accomplished by different embodiments that are intended to be encompassed within the spirit and scope of the present disclosure.

Figure 1:
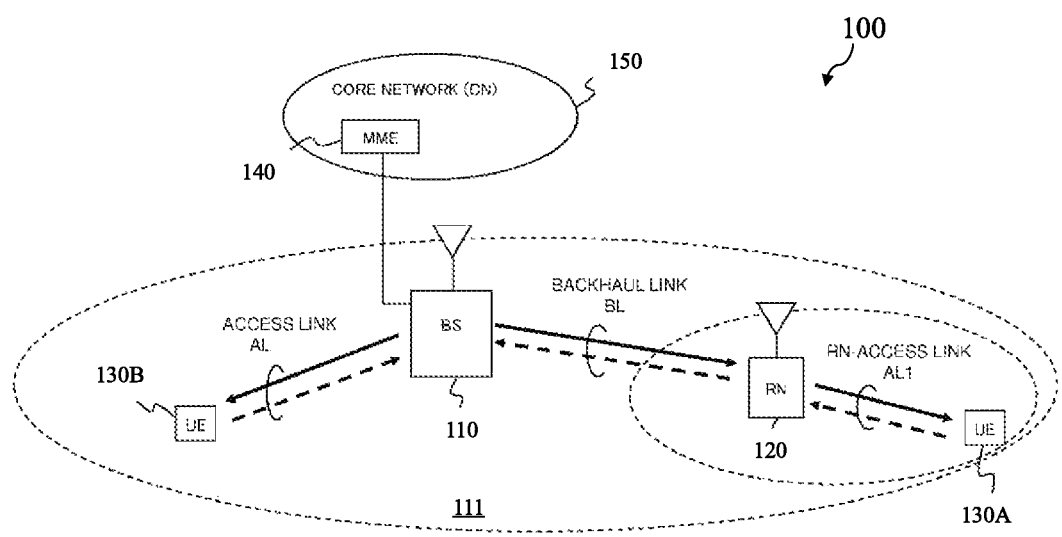
FIG. 1 illustrates a schematic wireless communication system according to an embodiment of the present disclosure.

FIG. 1 illustrates a wireless communication system 100 according to an embodiment of the present disclosure.

Referring to FIG. 1, a wireless communication system 100 may include some nodes (e.g., BS 110 and RN 120) and some UEs (e.g., UE 130A and UE 130B). Although, for simplicity, merely two nodes are illustrated in FIG. 1, it is contemplated that wireless communication system 100 may also include more or fewer nodes in some other embodiments of the present disclosure. Although, for simplicity, merely two UEs are illustrated in FIG. 1, it is also contemplated that wireless communication system 100 may include more or fewer UEs in some other embodiments of the present disclosure.

The BS 110, which communicates with a Core Network (CN) 150, may operate or work under the control of a Mobility Management Entity (MME) 140. The core network may include a Home Subscriber Server (HSS) (not illustrated in FIG. 1), which communicatively coupled with the MME. The BS 110 may operate, for example based on the standard protocol such as Long-Term Evolution (LTE), LTE-Advanced (LTE-A), New Radio (NR), or other suitable protocol(s). For example, the BS 110 may include an eNB or a gNB, and may define one or more cells (e.g., cell 111). The RN 120 may include a relay node or an integrated access and backhaul node (IAB node). UE 130A may include, for example, but is not limited to, a computing device, a wearable device, a mobile device, an IoT device, etc. UE 130B may include a device that is the same or similar to UE 130A. UE 130B may also include a device different from UE 130A. Persons skilled in the art should understand that as technology develops and advances, the terminologies described in the present disclosure may change, but should not affect or limit the principles and spirit of the present disclosure.

BS 110 (or Donor BS) may establish radio connections with UE 130B and RN 120 through an Access Link (AL) and a Backhaul Link (BL) based on protocol Layer-1 (Physical Layer) to Layer-3 (Radio Resource Control (RRC) Layer), respectively.

In some embodiments of the present disclosure, RN 120 may establish a radio connection with UE 130A through a RN-access link (AL1) based on protocol Layer-1 to Layer-3. In some other embodiments of the present disclosure, the RN 120 may establish a radio connection with the UE 130A through the AL1 based on protocol Layer-1 to Layer-2.

Although FIG. 1 merely shows that the Donor BS 110 is connected to a single UE for simplicity, it is contemplated that the Donor BS 110 may provide or establish connections with multiple UEs. Similarly, although FIG. 1 merely shows that the RN 120 is connected to a single UE for simplicity, it is contemplated that the RN 120 may also provide or establish connections with multiple UEs.

Deployment of RN(s) helps to enhance and/or extend coverage of a BS by a backhaul link. Evolved Universal Terrestrial Radio Access Network (E-UTRAN) supports relaying by having a RN wirelessly connect to an eNB serving the RN, called Donor eNB (DeNB), via a modified version of the Evolved Universal Terrestrial Radio Access (E-UTRA) radio interface, i.e., the BL, also referred to as the Un interface. The radio interface that provides radio protocol connection between RN and the UE is referred to as the Uu interface. Relay function and use of RN/DeNB entities in a network is transparent to the operations of the connected UEs.

As mentioned above, 3GPP is envisioning an IAB architecture for the 5G (NR) communication networks supporting multi-hop relays. In other words, an IAB node may hop through one or more IAB nodes before reaching the IAB Donor. Single hop may be considered a special instance of multiple hops. Multi-hop backhauling is relatively beneficial because it provides relatively greater coverage extension compared to single-hop backhauling. In a relatively high frequency radio communication system (e.g., radio signals transmitted in frequency bands over 6 GHz), relatively narrow or less signal coverage may benefit from multi-hop backhauling techniques. Multi-hop backhauling further enables backhauling around obstacles (e.g., buildings in urban environments for in-clutter deployments).

The maximum number of hops in RN deployment may depend on various factors, for example but is not limited to, frequency, cell density, propagation environment, traffic load, or other factors. These factors are expected to change over time. Therefore, from the perspective of the network architecture, it is desirable to ensure the flexibility in hop count. On the other hand, as the number of hops increases, scalability issues may arise. For example, performance may degrade or network load may increase to an unacceptable level.

Figure 2:
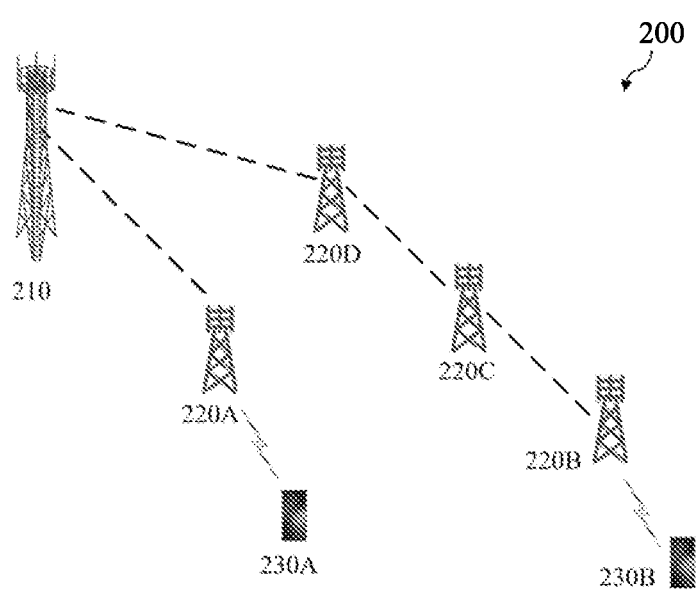
FIG. 2 illustrates a schematic wireless communication system according to an embodiment of the present disclosure.

FIG. 2 illustrates a wireless communication system 200 according to an embodiment of the present disclosure.

Referring to FIG. 2, the wireless communication system 200 can include a Donor node (e.g., IAB Donor 210), some IAB nodes (e.g., IAB node 220A, IAB node 220B, IAB node 220C, and IAB node 220D), and some UEs (e.g., UE 230A and UE 230B). Although merely one Donor node is illustrated in FIG. 2 for simplicity, it is contemplated that wireless communication system 200 may include more Donor node(s) in some other embodiments of the present disclosure. Similarly, although merely four IAB nodes are illustrated in FIG. 2 for simplicity, it is contemplated that wireless communication system 200 may include more or fewer IAB nodes in some other embodiments of the present disclosure. Although merely two UEs are illustrated in FIG. 2 for simplicity, it is contemplated that wireless communication system 200 may include more or fewer UEs in some other embodiments of the present disclosure.

IAB node 220A and IAB node 220D can be directly connected to IAB Donor 210. IAB node 220A and IAB node 220D may be connected to different Donor nodes in accordance with some other embodiments of the present disclosure.

IAB node 220C can reach IAB Donor 210 by hopping through IAB node 220D. IAB node 220D is a parent IAB node of IAB node 220C. In other words, IAB node 220C may be a child node of IAB node 220D. IAB node 220B can reach IAB Donor 210 by hopping through IAB node 220C and IAB node 220D. IAB node 220C and IAB node 220D may be upstream nodes of IAB node 220B, and IAB node 220C may be a parent IAB node of IAB node 220B. In other words, IAB node 220B may be the child node of IAB node 220C. IAB node 220B and IAB node 220C may be downstream nodes of IAB node 220D. UE 230A can be directly connected to IAB node 220A, and UE 230B can be directly connected to IAB node 220B. In other words, UE 230A and UE 230B may be served by IAB node 220A and IAB node 220B, respectively.

Each of IAB node 220A, IAB node 220B, IAB node 220C, and IAB node 220D may be directly connected to one or more UE(s) in accordance with some other embodiments of the present disclosure.

Each of IAB node 220A, IAB node 220B, IAB node 220C, and IAB node 220D may be directly connected to one or more IAB node(s) in accordance with some other embodiments of the present disclosure.

In the wireless communication system 200, which provides multi-hop relay, a wireless backhaul link may fail due to, for example but is not limited to, blockage by moving object(s) (e.g., vehicle(s)), foliage (caused by seasonal changes), or new buildings (e.g., infrastructure changes). Such backhaul link failure may occur on a physically stationary IAB node or a mobile IAB node. Link switching techniques have been developed to address this issue.

Assuming a Radio Link Failure (RLF) occurs on the backhaul link between IAB Donor 210 and IAB node 220D, IAB node 220D may establish a link to another Donor node (not illustrated in FIG. 2). In other words, IAB node 220D may switch from the link between IAB node 220D and IAB Donor 210 to a link between IAB node 220D and another Donor node (not illustrated in FIG. 2).

Assuming an RLF occurs on the backhaul link between two IAB nodes (e.g., IAB node 220D and IAB node 220C), IAB node 220C may establish a link to another IAB node (e.g., IAB node 220A). In other words, IAB node 220C may switch from the link between IAB node 220C and IAB node 220D to a link between IAB node 220C and a candidate IAB node 220A.

Another solution is to perform an alternative route switching procedure. For example, IAB Donor 210 may configure an alternative route for IAB node 220C (e.g., alternative route A: IAB donor 210→IAB node 220A→IAB node 220C, which is not illustrated in FIG. 2). In the case that an RLF occurs on the backhaul link between IAB node 220D and IAB node 220C or between IAB Donor 210 and IAB node 220D, IAB node 220C may skip candidate node selection and directly access the candidate node (e.g., IAB node 220A) in the alternative route A.

In the wireless communication system 200, in order to improve the reliability of data transmission or signaling transmission and to reduce latency, a duplication function may be provided. This function is characterized in that a packet and its duplicate will be transmitted through two independent transmission paths, respectively. The duplication function may be activated or deactivated on the BS side, the IAB node side, and/or the UE side.

Downlink duplication refers to that a BS may transmit a packet (original packet) and its duplicate (duplicate packet) to an IAB node through two independent transmission paths, respectively. For example, IAB Donor 210 may transmit to IAB node 220C an original packet through IAB node 220A and a duplicate packet through IAB node 220D. If IAB node 220C receives one of the original and duplicate packets, it will discard the other one.

On the other hand, uplink duplication refers to that an IAB node or a UE may transmit a packet (original packet) and its duplicate (duplicate packet) to a BS through two independent transmission paths, respectively. For example, IAB node 220C may transmit to IAB Donor 210 an original packet through IAB node 220A and a duplicate packet through IAB node 220D. If IAB Donor 210 receives one of the original and duplicate packets, it will discard the other one.

Figure 3:
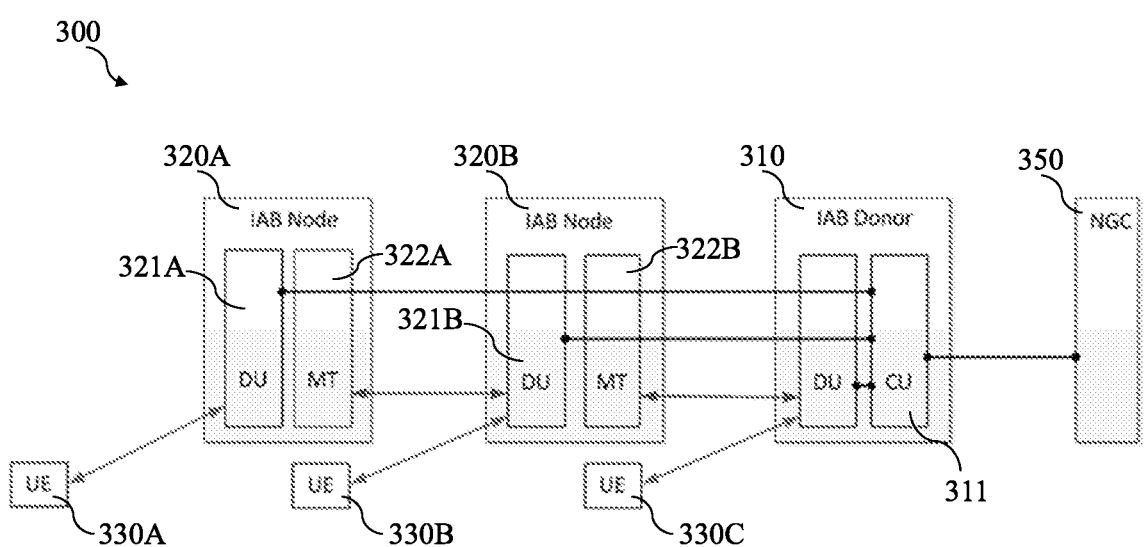
FIG. 3 illustrates a schematic wireless communication system according to an embodiment of the present disclosure.

FIG. 3 illustrates a wireless communication system 300 according to an embodiment of the present disclosure.

Referring to FIG. 3, the wireless communication system 300 may include IAB donor 310, IAB node 320A, IAB node 320B, UE 330A, UE 330B, UE 330C and a Next-Generation Core (NGC) 350.

Each of the IAB node 320A and IAB node 320B may include a Distributed Unit (DU) and a Mobile Termination (MT). In the context of this disclosure, MT is referred to as a function resided in an IAB node that terminates the radio interface layers of the backhaul Uu interface toward an IAB donor or other IAB nodes. The IAB nodes may be connected to an upstream IAB node or a BS (e.g., an IAB donor) via the MT function. The IAB nodes may be connected to UEs and a downstream IAB node via the DU.

IAB node 320A may be connected to an upstream IAB node 320B via MT 322A function. IAB node 320A may be connected to UE 330A via the DU 321A. IAB node 320B may be connected to an upstream IAB node or IAB donor 310 via MT 322B function. IAB node 320B may be connected to UE 330B via DU 321B. IAB node 320B may be connected to downstream IAB node 320A via DU 321B.

In some embodiments of the present disclosure, IAB nodes as shown in FIG. 3 may include Layer-2 (L2) IAB nodes.

Referring back to FIG. 2, the IAB nodes (e.g., IAB node 220A, IAB node 220B, IAB node 220C, and IAB node 220D) may include L2 IAB nodes.

Referring to FIG. 3, the BS (e.g., IAB donor 310) may include at least one DU to support UEs and MTs of downstream IAB nodes. One DU of a BS can support at least one cell. One cell can be supported by only one DU of a BS or DU of an IAB node.

A Central Unit (CU) 311 included in the IAB donor 310 controls the DUs of all IAB nodes (e.g., IAB node 320A and IAB node 320B) and the DU resided in the IAB donor 310. The DU(s) and the CU of an IAB donor may be co-located or may be located in different positions. The DU(s) and the CU of the IAB donor are connected via F1 interface. In other words, the F1 interface provides a means for interconnecting the CU and the DU(s) of an IAB donor. The F1 Application Protocol (F1AP) supports the functions of the F1 interface by certain F1AP signaling procedures.

In some embodiments of the present disclosure, each of the DU of the IAB donor 310, IAB node 320A and IAB node 320B may host adaptation layer, Radio Link Control (RLC) layer, Medium Access Control (MAC) layer and Physical layer (PHY). The adaptation layer may be configured by the CU of a BS. The adaptation layer performs many functions including routing and bearer mapping (e.g., mapping of backhaul RLC channels), and may include a Transmit (TX) component and a Receive (RX) part.

The TX component of the adaptation layer performs routing and "bearer mapping". The RX component of the adaptation layer performs "bearer de-mapping". For example, the RX component of the adaptation layer may de-map received packets and may found that the de-mapped packets are destined for another node (target node), for example, a downstream node or an upstream node. Then, the RX component of the adaptation layer may forward the received packets the de-mapped packets to the TX component of the adaptation layer. The TX component of the adaptation layer may perform routing and "bearer mapping" on the de-mapped packets and forward the same to the target node.

As mentioned above, in a wireless communication system supporting multi-hop relays, the backhaul link(s) may fail. Referring to FIG. 2, IAB node 220D would know that an RLF occurs on the backhaul link between IAB Donor 210 and IAB node 220D upon, for example, detecting certain problems in its physical layer. However, the downstream nodes of the IAB node 220D may not be aware of such connectivity loss and thus cannot perform a timely adjustment, which may cause problems such as discontinuation of service and packet loss at these downstream nodes. Therefore, a procedure for informing the network of change(s) in the backhaul link(s) is required.

Embodiments of the present disclosure propose technical solutions for transmitting radio link information associated with a radio link, which can at least solve the above problems in the new generation communication systems, such as 5G communication systems. More details on the embodiments of the present disclosure will be illustrated in the following text in combination with the appended drawings.

Figure 4:
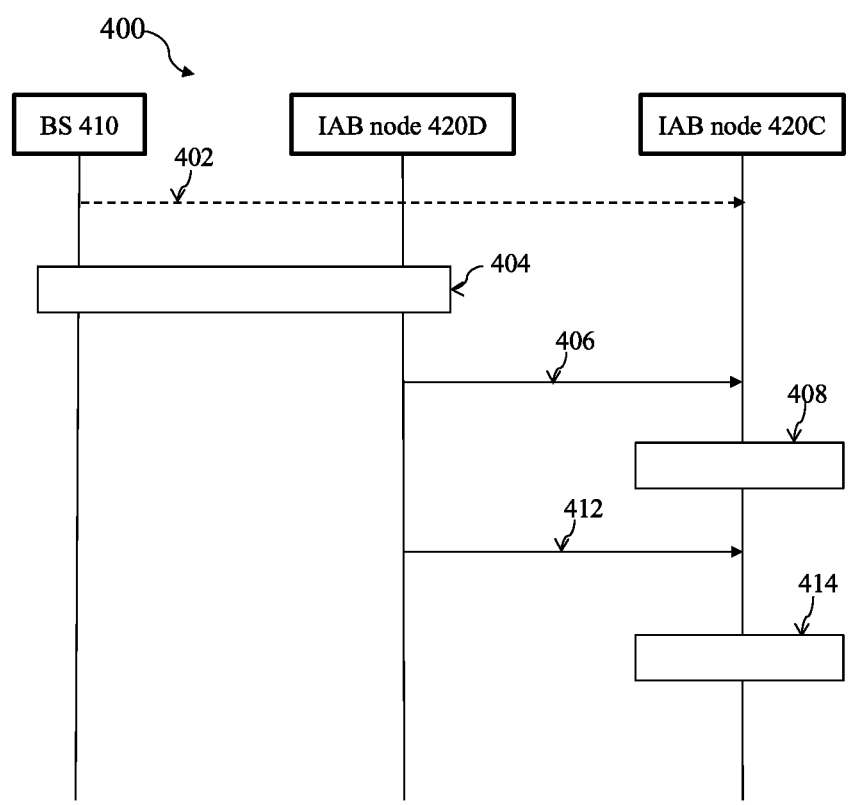
FIG. 4 illustrates a flow chart of an exemplary procedure of transmitting radio link information according to an embodiment of the present disclosure.

FIG. 4 illustrates a flow chart of an exemplary procedure 400 of transmitting radio link information according to an embodiment of the present disclosure.

In FIG. 4, IAB node 420D and IAB node 420C are accessing BS 410. IAB node 420C is a child node of IAB node 420D. In other words, IAB node 420C is accessing the BS 410 via the IAB node 420D. The IAB node 420C and IAB node 420D may include respective MTs and DUs (not illustrated in FIG. 4), and the BS 410 may include at least one DU and a CU (not illustrated in FIG. 4).

For example, the IAB node 420C may function as IAB node 220C shown in FIG. 2, the IAB node 420D may function as IAB node 220D shown in FIG. 2, and the BS 410 may function as the IAB donor 210 shown in FIG. 2.

At step 404, an RLF may occur on the radio link between BS 410 and IAB node 420D. In some embodiments, IAB node 420D may detect problems in its physical layer, and may declare an RLF on the radio link between the BS 410 and IAB node 420D. For example, IAB node 420D may start a synchronization timer upon detect certain problems in its physical layer, may stop the timer upon receiving certain indications, and may declare an RLF upon the expiry of the synchronization timer. In some embodiments, the synchronization timer may be Timer T310, as defined in 3GPP specification TS 38.331. The expiry of the Timer T310 indicates that an RLF happens on the radio link between IAB node 420D and its parent node (e.g., BS 410).

In response to the expiry of the synchronization timer, the IAB node 420D may try to recover the failed link. For example, the IAB node 420D may initiate a RRC connection Reestablishment procedure, upon which a Reestablishment Initiation Timer (e.g., Timer T311 as defined in 3GPP specification TS 38.331) may be started. Upon selection of a suitable cell, the IAB node 420D may stop the Reestablishment Initiation Time (e.g., Timer T311).

During the Reestablishment procedure, a Reestablishment Request Timer (e.g., Timer T301 as defined in 3GPP specification TS 38.331) may be started in the case that the IAB node 420D transmits a RRC Connection Reestablishment Request message to the selected cell. Upon receiving a RRC Connection Reestablishment message from the selected cell, the IAB node 420D may stop the Reestablishment Request Timer (e.g., Timer T301) and may transmit a RRC Reestablishment Complete message to the selected cell in response.

At step 406, the IAB node 420D may transmit radio link information associated with the radio link between BS 410 and IAB node 420D to the downstream nodes (e.g., IAB node 420C) of the IAB node 420D. In some embodiments of the present disclosure, the radio link information may indicate that an RLF occurs on the radio link between the BS 410 and IAB node 420D, and an attempt to recover from the RLF is in progress. In some embodiments of the present disclosure, MT of the IAB node 420D may instruct DU of the IAB node 420D to transmit the radio link information to the downstream nodes of the IAB node 420D.

In some embodiments of the present disclosure, the radio link information may be transmitted in response to a declaration of the RLF between the IAB node 420D and the BS 410. In some embodiments of the present disclosure, the radio link information may be transmitted in response to an expiry of a synchronization timer (e.g., Timer T310). In some embodiments of the present disclosure, the radio link information may be transmitted in response to an initiation of a RRC connection Reestablishment procedure. In some embodiments, the radio link information may be transmitted in response to the start of the Reestablishment Initiation Timer (e.g., Timer T311). In some embodiments of the present disclosure, the radio link information may be transmitted in response to a transmission of a RRC Connection Reestablishment Request message. In some embodiments, the radio link information may be transmitted in response to the start of the Reestablishment Request Timer (e.g., Timer T301).

In some embodiments of the present disclosure, the radio link information may further include a value for a timer. In some other embodiments of the present disclosure, the procedure 400 may include step 402 (denoted by dotted arrow as an option). At step 402, the BS 410 may transmit a RRC signaling message including a value for a timer to IAB node 420C.

In some embodiments of the present disclosure, the radio link information may further include a suspend indication. The suspend indication may instruct the node which receives the suspend indication (i.e., the receiving node) to perform certain operations at the receiving node.

In some embodiments of the present disclosure, the suspend indication may indicate whether or not to suspend timers in the RLC layer (RLC timers) at the receiving node and prevent the RLC timers from starting. The RLC timers may include, for example, at least one of Timer t-pollRetransmit, Timer t-reassembly, or Timer t-prohibitStatus, as defined in 3GPP specification TS 38.322.

In some embodiments of the present disclosure, the suspend indication may indicate whether to allow or prohibit certain operations in the MAC layer at the receiving node. The operations in the MAC layer may include, for example, at least one of the following: performing a Random Access (RA) procedure, transmitting a Scheduling Request (SR), transmitting a Buffer Status Report (BSR), or using configured grants. The definition of SR, BSR, and configured grants are defined in 3GPP specification TS 38.321.

In some embodiments of the present disclosure, the suspend indication may include a one-bit indication. In some embodiments, a value of the suspend indication being "1" may represent that the RLC timers at the receiving node should be suspended, stopped, or forbidden from starting, depending on the status of the RLC timers; and a value of the suspend indication being "0" may represent no such impact on the RLC layer; or vice versa. In some embodiments, a value of the suspend indication being "1" may represent that certain operations in the MAC layer of the receiving node should be prohibited; and a value of the suspend indication being "0" may represent no such impact on the MAC layer; or vice versa. In some embodiments, a value of the suspend indication being "1" may represent the above impacts on both the RLC layer and the MAC layer as described above; and a value of the suspend indication being "0" may represent no such impact on either the RLC layer or the MAC layer; or vice versa.

In some embodiments of the present disclosure, the radio link information may further include information indicating the two nodes between which the radio link is formed. In some embodiments, the radio link information may further include the IDs of the two nodes between which the radio link is formed. The ID of a node may be a cell identity of the node (e.g., a physical cell identity (PCI)) or an identity of a DU of the node (e.g., a gNB-DU ID). For example, the radio link information may include the ID of the IAB node 420D and the ID of the BS 410.

At step 408, in response to receiving the radio link information, IAB node 420C may perform certain operations.

In some embodiments of the present disclosure, the IAB node 420C may forward the received radio link information to its downstream nodes, if any. For example, referring to FIG. 2, in response to receiving radio link information from IAB node 220D, IAB node 220C may forward the received radio link information to IAB node 220B.

Referring back to FIG. 4, in some embodiments of the present disclosure, in response to receiving the radio link information, the IAB node 420C may suspend or stop any running RLC timers and may prevent the RLC timers from starting. The RLC timers may include, for example, at least one of Timer t-pollRetransmit, Timer t-reassembly, or Timer t-prohibitStatus. In some embodiments, in the case that the radio link information includes a suspend indication as describe above, the IAB node 420C may determine whether to perform the above operations on the RLC timers based on the suspend indication. For example, the IAB node 420C may determine to suspend or stop any running RLC timers and prevent the RLC timers from starting based on a value of the suspend indication being, for example, "1".

In some embodiments of the present disclosure, in response to receiving the radio link information, the IAB node 420C may prohibit certain operations in the MAC layer. The operations in the MAC layer may include, for example, at least one of the following: performing a RA procedure; transmitting a SR or a BSR; or using configured grants. In some embodiments, in the case that the radio link information includes a suspend indication as describe above, the IAB node 420C may prohibit the above operations in the MAC layer based on the suspend indication. For example, the IAB node 420C may prohibit the above operations in the MAC layer based on a value of the suspend indication being, for example, "1".

In some embodiments of the present disclosure, in the case that the radio link information includes a value for a timer or the value for the timer is configured by the BS 410 at the IAB node 420C as describe above, the IAB node 420C may start the timer (timer A) according to the value of the timer upon the receipt of the radio link information. Once timer A expires, the IAB node 420C may perform a reestablishment procedure with a communication node that is not the current serving cell (i.e., the IAB node 420D) of the IAB node 420C. In other words, during the cell selection for reestablishment, the current serving cell (i.e., the IAB node 420D) of IAB node 420C cannot be selected as a suitable cell for reestablishment.

In some embodiments of the present disclosure, an alternative route may be configured at the IAB node 420C. In these embodiments, in response to receiving the radio link information, the IAB node 420C may perform an alternative route switching procedure in the case that the alternative route configured at the IAB node 420C does not include the two nodes which terminate the radio link (e.g., IAB node 420D and BS 410). In such case, steps 412 and 414 would be omitted from the exemplary procedure 400.

For example, referring to FIG. 2, IAB Donor 210 may configure an alternative route for IAB node 220B (e.g., alternative route: IAB donor 210→IAB node 220A→IAB node 220B, which is not illustrated in FIG. 2). An RLF may occur on the radio link between the IAB node 220D and the IAB node 220C. In response to receiving the radio link information from the IAB node 220C, the IAB node 220B may perform an alternative route switching procedure to access IAB node 220A in the configured alternative route since the IAB node 220D and the IAB node 220C are not included in the alternative route for IAB node 220B.

Referring back to FIG. 4, in some embodiments of the present disclosure, uplink duplication may be configured at the IAB node 420C. In these embodiments, in the case that the uplink duplication is in a deactivated status, the IAB node 420C may activate the uplink duplication in response to receiving the radio link information.

For example, referring to FIG. 2, uplink duplication may be configured and may be in a deactivated status at IAB node 220C. An RLF may occur on the radio link between the IAB node 220D and the IAB donor 210. In response to receiving the radio link information from the IAB node 220D, the IAB node 220C may activate the uplink duplication such that data can be transmitted to the IAB donor 210 via, for example, IAB node 220A.

Referring back to FIG. 4, at step 412, the IAB node 420D may transmit radio link information associated with the radio link between BS 410 and IAB node 420D to the downstream nodes (e.g., IAB node 420C) of the IAB node 420D.

In some embodiments of the present disclosure, the radio link information transmitted at step 412 may indicate that the failed radio link has been successfully recovered. In these embodiments, the radio link information may be transmitted in response to a receipt of the RRC Connection Reestablishment message or in response to a transmission of the RRC Reestablishment Complete message.

In some embodiments of the present disclosure, the radio link information transmitted at step 412 may further include information indicating the two nodes between which the radio link is formed. In some embodiments, the radio link information may further include the IDs of the two nodes between which the radio link is formed. For example, the radio link information may include the ID of the IAB node 420D and the ID of the BS 410.

In some embodiments of the present disclosure, the radio link information transmitted at step 412 may indicate that the attempt to recover from the RLF at the IAB node 420D has failed. In these embodiments, the radio link information may be transmitted in response to an expiry of the Reestablishment Initiation Timer (e.g., Timer T311) or in response to an expiry of the Reestablishment Request Timer (e.g., Timer T301).

In some embodiments of the present disclosure, the radio link information transmitted at step 412 may further include information indicating the two nodes between which the radio link is formed. In some embodiments, the radio link information may further include the IDs of the two nodes between which the radio link is formed. For example, the radio link information may include the ID of the IAB node 420D and the ID of the BS 410.

At step 414, in response to receiving the radio link information, IAB node 420C may perform certain operations.

In some embodiments of the present disclosure, in the case that timer A was started, the IAB node 420D may stop timer A at step 414.

In some embodiments of the present disclosure, in the case that the received radio link information indicates a successful RLF recovery, the IAB node 420C may allow the RLC timers to be started and may additionally resume the suspended RLC timers, if any, of the IAB node 420C. The RLC timers may include, for example, at least one of Timer t-pollRetransmit, Timer t-reassembly, or Timer t-prohibit-Status.

In some embodiments of the present disclosure, in the case that the received radio link information indicates a successful RLF recovery, the IAB node 420C may allow certain operations in the MAC layer. The operations in the MAC layer may include, for example, at least one of the following: performing a RA procedure; transmitting a SR or a BSR; or using configured grants.

In some embodiments of the present disclosure, in the case that the received radio link information indicates a successful RLF recovery and the uplink duplication is activated at the IAB node 420C, the IAB node 420C may deactivated the uplink duplication at the IAB node 420C.

In some embodiments of the present disclosure, in the case that the received radio link information indicates an RLF recovery failure, the IAB node 420C may perform an alternative route switching procedure or a reestablishment procedure. For example, in some embodiments, in the case that an alternative route is configured at the IAB node 420C and does not include the two nodes between which the radio link is formed (e.g., IAB node 420D and BS 410), the IAB node 420C may perform an alternative route switching procedure. In some embodiments, the IAB node 420C may perform a reestablishment procedure with a communication node that is not the current serving cell (i.e., the IAB node 420D) of the IAB node 420C. In other words, during the cell selection, the current serving cell (i.e., the IAB node 420D) of IAB node 420C cannot be selected as a suitable node for reestablishment.

Although the exemplary procedure 400 described herein may include steps 402, 404, 406, 408, 412, and 414, it should be appreciated by persons skilled in the art that some of the above steps in the exemplary procedure could be optionally omitted without departing from the spirit and scope of the disclosure. For example, in some embodiments, steps 402 to 408 may be omitted such that IAB node 420D transmits the radio link information only when an RLF recovery failure occurs as described above.

In some embodiments of the present disclosure, the above-mentioned radio link information may be transmitted via a MAC message. In some embodiments, the radio link information may be included in a MAC Control Element (CE) of a MAC Protocol Data Unit (PDU) and a dedicated type may be included in the MAC header of the MAC PDU to indicate the MAC CE including the radio link information. For example, in the MAC header of a MAC PDU, there may be one corresponding field (e.g., Logical Channel ID (LCID) field) indicating the type of each MAC CE. A dedicated LCID value may be assigned to indicate the MAC CE including the radio link information. The formats of such MAC CE will be described in detail in the following text.

Figure 5A:
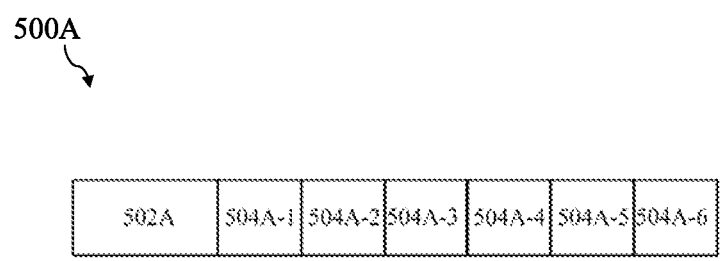
FIG. 5A illustrates an exemplary MAC control element according to an embodiment of the present disclosure.
Figure 5B:
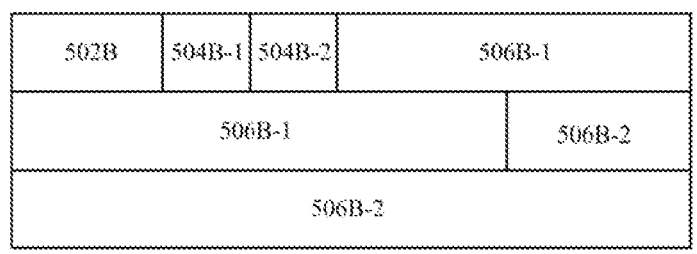
FIG. 5B illustrates an exemplary MAC control element according to an embodiment of the present disclosure.
Figure 5C:
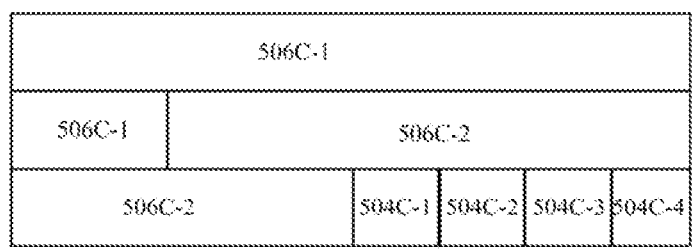
FIG. 5C illustrates an exemplary MAC control element according to an embodiment of the present disclosure.

FIGS. 5A-5C illustrate exemplary formats of a MAC CE according to embodiments of the present disclosure.

FIG. 5A illustrates an exemplary MAC CE 500A according to an embodiment of the present disclosure. The MAC CE 500A may include field 502A, field 504A-1, field 504A-2, field 504A-3, field 504A-4, field 504A-5, and field 504A-6. Field 502A may include two bits, and each of the fields 504A-1 to 504A-6 may include one bit. Therefore, the MAC CE 500A may include eight bits (i.e., 1 byte), and thus is octet aligned. Although FIG. 5A shows that MAC CE 500A starts with field 502A for simplicity, it is contemplated that field 502A can be located at anywhere in the MAC CE 500A.

As described above with respect to FIG. 4, the radio link information may indicate the current status of a radio link, i.e.: status (1): a failure occurs on the radio link, and an attempt to recover from the failure is in progress; status (2): the radio link has been successfully recovered; or status (3): the attempt to recover from the RLF has failed. Referring back to FIG. 5A, field 502A may be used to indicate the radio link information. For example, a value of field 502A being "00", "01", and "10" may represent status (1), status (2), and status (3), respectively. Other variations may be easily conceived of by persons skilled in the art. Fields 504A-1 to 504A-6 may be reserved for future use and may be set to a value of "0".

In some embodiments of the present disclosure, the radio link information may further include additional assistant information which may be indicated by at least one of fields 504A-1 to 504A-6. The fields that are not used to include the additional assistant information may be reserved for future use and may be set to a value of "0".

For example, in some embodiments, the radio link information may further include a value for a timer, and at least one field of the fields 504A-1 to 504A-6 may be used to indicate the value of the timer. For example, fields 504A-1 and 504A-2 may be used to indicate the value of the timer.

In some embodiments, the radio link information may further include a suspend indication, and at least one field of the fields 504A-1 to 504A-6 may be used to indicate the suspend indication. For example, in the case that the suspend indication being a one-bit indication, field 504A-6 may be used to indicate the suspend indication.

In some embodiments, the radio link information may further include both the value for the timer and the suspend indication, and respective fields of the fields 504A-1 to 504A-6 may be used to indicate the value for the timer and the suspend indication, respectively. For example, field 504A-1 may be used to indicate the value of the timer, and field 504A-2 may be used to indicate the suspend indication.

In some embodiments of the present disclosure, the radio link information may further include information indicating the two nodes between which a radio link is formed. In some embodiments, the radio link information may further include the IDs of the two nodes between which the radio link is formed. For example, referring to FIG. 4, the radio link information may include the ID of the IAB node 420D and the ID of the BS 410. FIG. 5B illustrates an exemplary MAC CE 500B that can be applied to the above embodiments.

Referring to FIG. 5B, the MAC CE 500B is octet aligned and specifically includes 3 bytes, the first, second, and third bytes being respectively referred to as "Oct 1", "Oct 2", and "Oct 3" in the figure. The MAC CE 500B may include field 502B, field 504B-1, field 504B-2, field 506B-1, and field 506B-2. Field 502B may include two bits, each of the field 504B-1 and field 504B-2 may include one bit, each of the field 506B-1 and field 506B-2 may include 10 bits. Thus, the field 506B-1 occupies 4 bits of byte "Oct 1" and 6 bits of byte "Oct 2"; the field 506B-2 occupies 2 bits of byte "Oct 2" and all 8 bits of byte "Oct 3".

Field 502B may be used to indicate the current status of a radio link in a similar manner as described above with respect to FIG. 5A. Field 506B-1 and field 506B-2 may be used to indicate the IDs of the two nodes between which a radio link is formed, respectively. Field 504B-1 and field 504B-2 may be reserved for future use and may be set to a value of "0".

In some embodiments of the present disclosure, the radio link information may further include additional assistant information which may be carried by at least one of the field 504B-1 and field 504B-2. The field that is not used to indicate the additional assistant information may be reserved for future use and may be set to a value of "0".

For example, in some embodiments, the radio link information may further include a value for a timer, and at least one field of the field 504B-1 and field 504B-2 may be used to indicate the value of the timer. For example, field 504B-1 may be used to indicate the value of the timer.

In some embodiments, the radio link information may further include a suspend indication, and at least one field of the field 504B-1 and field 504B-2 may be used to indicate the suspend indication. For example, in the case that the suspend indication is a one-bit indication, field 504B-2 may be used to indicate the suspend indication.

In some embodiments, the radio link information may further include both the value for the timer and the suspend indication. In these embodiments, one of field 504B-1 and field 504B-2 may be used to indicate the value for the timer, and the other may be used to indicate the suspend indication.

Although FIG. 5B shows that MAC CE 500B starts with field 502B followed by fields 504B-1, 504B-2, 506B-1, and 506B-2 for simplicity, various modifications to this arrangement are readily apparent to persons skilled in the art. For example, MAC CE 500B may start with field 502B followed by fields 506B-1, 506B-2, 504B-1, and 504B-2.

Moreover, although FIG. 5B shows that the node ID includes 10 bits for simplicity, it is contemplated that the node ID may include more or fewer than 10 bits. For example, the node ID may include 32 bits. Corresponding modifications to the above exemplary format is readily apparent to persons skilled in the art.

Referring to FIG. 4, as mentioned above, in some embodiments of the present disclosure, IAB node 420D transmits the radio link information only when an RLF recovery failure occurs. In these embodiments, the radio link information may be implemented by a dedicated type in a MAC header of a MAC PDU. For example, a dedicated LCID value may be specified in the MAC header to indicate the RLF recovery failure. The MAC PDU may or may not include a MAC CE corresponding to the dedicated LCID, depending on the existence of additional assistant information, as will be described below.

For example, in some embodiments, the radio link information may further include additional assistant information such as information indicating the two nodes between which a radio link is formed. FIG. 5C illustrates an exemplary MAC CE 500C that can be applied to the above embodiments.

Referring to FIG. 5C, the MAC CE 500C is octet aligned and specifically includes 3 bytes, the first, second, and third bytes being respectively referred to as "Oct 1", "Oct 2", and "Oct 3" in the figure. The MAC CE 500C may include field 506C-1, field 506C-2, field 504C-1, field 504C-2, field 504C-3, and field 504C-4. Each of the field 506C-1 and field 506C-2 may include 10 bits, and each of the field 504C-1, field 504C-2, field 504C-3, and field 504C-4 may include one bit. Thus, the field 506C-1 occupies all 8 bits of byte "Oct 3" and 2 bits of byte "Oct 2"; the field 506C-2 occupies 6 bits of byte "Oct 2" and 4 bits of byte "Oct 3".

Field 506C-1 and field 506C-2 may be used to indicate the IDs of the two nodes between which a radio link is formed, respectively. Field 504C-1, field 504C-2, field 504C-3, and field 504C-4 may be reserved for future use and may be set to a value of "0".

Although FIG. 5C shows that MAC CE 500C starts with field 506C-1 followed by fields 506C-2, 504C-1, 504C-2, 504C-3, and 504C-4 for simplicity, various modifications to this arrangement are readily apparent to persons skilled in the art. For example, MAC CE 500C may start with field 504C-1 followed by fields 504C-2, 504C-3, 504C-4, 506C-1, and 506C-2.

Moreover, although FIG. 5C shows that the node ID includes 10 bits for simplicity, it is contemplated that the node ID may include more or fewer than 10 bits. For example, the node ID may include 32 bits. Corresponding modifications to the above exemplary format is readily apparent to persons skilled in the art.

In some embodiments of the present disclosure, the above-mentioned radio link information may be transmitted via an adaptation layer message.

In some embodiments, as described above with respect to FIG. 4, the radio link information may indicate the current status of a radio link, i.e.: status (1): a failure occurs on the radio link, and an attempt to recover from the failure is in progress; status (2): the radio link has been successfully recovered; or status (3): the attempt to recover from the RLF has failed. In these embodiments, the adaptation layer message may include a two-bit status indication to indicate the current status of a radio link. For example, a value of the two-bit status indication being "00", "01", and "10" may represent status (1), status (2), and status (3), respectively. Other variations may be easily conceived of by persons skilled in the art.

In some embodiments, as described above with respect to FIG. 4, the radio link information may be transmitted only when an RLF recovery failure occurs. In these embodiments, the adaptation layer message may include a one-bit status indication to indicate the RLF recovery failure.

In the above embodiments, the radio link information may further include additional assistant information such as information indicating the two nodes between which a radio link is formed. In such case, the information indicating the two nodes (e.g., IDs of the two nodes) should also be included in the adaptation layer message.

Figure 6:
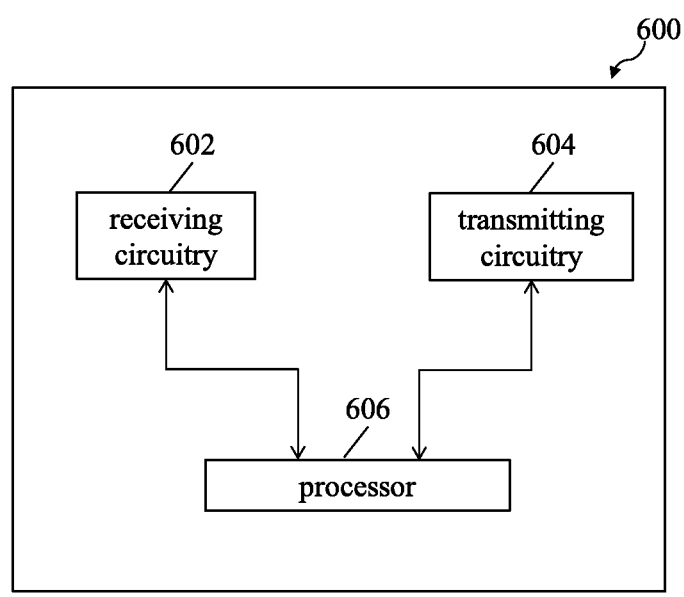
FIG. 6 illustrates an example block diagram of an apparatus according to an embodiment of the present disclosure.

FIG. 6 illustrates an example block diagram of an apparatus 600 according to an embodiment of the present disclosure.

As shown in FIG. 6, the apparatus 600 may include at least one non-transitory computer-readable medium (not illustrated in FIG. 6), a receiving circuitry 602, a transmitting circuitry 604, and a processor 606 coupled to the non-transitory computer-readable medium (not illustrated in FIG. 6), the receiving circuitry 602 and the transmitting circuitry 604. The apparatus 600 may be a BS or an IAB node.

Although in this figure, elements such as processor 606, transmitting circuitry 604, and receiving circuitry 602 are described in the singular, the plural is contemplated unless limitation to the singular is explicitly stated. In some embodiments of the present disclosure, the receiving circuitry 602 and the transmitting circuitry 604 are combined into a single device, such as a transceiver. In certain embodiments of the present disclosure, the apparatus 600 may further include an input device, a memory, and/or other components.

In some embodiments of the present disclosure, the non-transitory computer-readable medium may have stored thereon computer-executable instructions to cause a processor to implement the method with respect to the IAB node as described above. For example, the computer-executable instructions, when executed, cause the processor 606 interacting with receiving circuitry 602 and transmitting circuitry 604, so as to perform the steps with respect to the IAB node depicted in FIGS. 2-4.

In some embodiments of the present disclosure, the non-transitory computer-readable medium may have stored thereon computer-executable instructions to cause a processor to implement the method with respect to the BS as described above. For example, the computer-executable instructions, when executed, cause the processor 606 interacting with receiving circuitry 602 and transmitting circuitry 604, so as to perform the steps with respect to the BS depicted in FIGS. 2-4.

Those having ordinary skill in the art would understand that the steps of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the steps of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "includes", "including", or any other variation thereof, are intended to cover a non-exclusive inclusion, such that a process, method, article, or apparatus that includes a list of elements does not include only those elements but may include other elements not expressly listed or inherent to such process, method, article, or apparatus. An element proceeded by "a", "an", or the like does not, without more constraints, preclude the existence of additional identical elements in the process, method, article, or apparatus that includes the element. Also, the term "another" is defined as at least a second or more. The term "having" and the like, as used herein, are defined as "including".

The following is what is claimed:

1. A method of an integrated access and backhaul (IAB) node, the method comprising:
    transmitting, via an adaptation layer message, radio link information, wherein the radio link information is associated with a backhaul link and the adaptation layer message comprises a status indication of the backhaul link, the status indication indicating that a failure occurs on the backhaul link and an attempt to recover from the failure is in progress;
    wherein the radio link information is transmitted in response to an expiry of a reestablishment initiation timer or an expiry of a reestablishment request timer.

2. The method of claim 1, wherein the radio link information comprises information indicating two nodes which terminate the backhaul link.

3. The method of claim 1, wherein the radio link information is transmitted in response to:
    an expiry of a synchronization timer;
    a declaration of the failure;
    an initiation of a radio resource control connection re-establishment procedure; or
    a transmission of a radio resource control re-establishment request message.

4. The method of claim 1, wherein the radio link information is transmitted in response to:
    a receipt of a radio resource control connection re-establishment message; or
    a transmission of a radio resource control connection re-establishment complete message.

5. A method of an integrated access and backhaul (IAB) node, the method comprising:
    receiving, via an adaptation layer message, radio link information that is associated with a backhaul link, wherein the adaptation layer message comprises a status indication of the backhaul link, the status indication indicating that a failure occurs on the backhaul link and an attempt to recover from the failure is in progress;
    wherein the radio link information is received in response to an expiry of a reestablishment initiation timer or an expiry of a reestablishment request timer.

6. The method of claim 5, wherein the radio link information comprises information indicating two nodes which terminate the backhaul link.

7. The method of claim 5, wherein, the radio link information further comprises a value of a timer, and the method further comprises starting the timer in response to receiving the radio link information.

8. The method of claim 7, wherein, in response to an expiry of the timer, the method further comprises:
    performing a re-establishment procedure with a communication node, wherein the communication node does not include the current serving cell of the integrated access and backhaul node.

9. The method of claim 5, further comprising:
    receiving a radio resource control signaling message including a value of a timer;
    starting the timer in response to receiving the radio link information; and
    stopping the timer in response to receiving the radio link information.

10. The method of claim 5, wherein, the radio link information further comprises a suspend indication to indicate whether to suspend timers in a radio link control layer of the integrated access and backhaul node.

11. The method of claim 5 further comprising:
    suspending or stopping timers in a radio link control layer of the integrated access and backhaul node; and
    preventing the timers in the radio link control layer from starting.

12. The method of claim 5 further comprising: prohibiting at least one of the following:
    performing a random access procedure;
    transmitting a scheduling request or a buffer status report; or
    using configured grants.

13. The method of claim 5 method further comprising:
    performing an alternative route switching if an alternative route is configured at the integrated access and backhaul node and the alternative route does not include two nodes which terminate the backhaul link.

14. The method of claim 5, further comprising:
    activating an uplink duplication if the uplink duplication is configured at the integrated access and backhaul node and is in an deactivated status.

15. The method of claim 5, further comprising:
    resuming suspended timers in radio link control layer of the integrated access and backhaul node, or
    allowing the timers in the radio link control layer to be started.

16. The method of claim 5 further comprising:
    deactivating an uplink duplication if that the uplink duplication is activated at the integrated access and backhaul node; and
    allowing:
        performing a random access procedure;
        transmitting a scheduling request or a buffer status report; or
        using configured grants.

17. The method of claim 5, wherein the reestablishment initiation timer comprises a first timer, the reestablishment request timer comprises a second timer, and the method further comprises receiving, from a base station and via radio resource control signaling, a message indicating a value for a third timer.

18. The method of claim 17, further comprising, in response to receiving the radio link information, starting the third timer.

19. An integrated access and backhaul (IAB) node, comprising:
    at least one memory; and at least one processor coupled with the at least one memory and configured to cause the IAB node to:

transmit, via an adaptation layer message, radio link information, wherein the radio link information is associated with a backhaul link and the adaptation layer message comprises a status indication of the backhaul link, the status indication indicating that a failure occurs on the backhaul link and an attempt to recover from the failure is in progress;

wherein the radio link information is transmitted in response to an expiry of a reestablishment initiation timer or an expiry of a reestablishment request timer.

20. An integrated access and backhaul (IAB) node, comprising:

at least one memory; and at least one processor coupled with the at least one memory and configured to cause the IAB node to:

receive, via an adaptation layer message, radio link information, wherein the radio link information is associated with a backhaul link and the adaptation layer message comprises a status indication of the backhaul link, the status indication indicating that a failure occurs on the backhaul link and an attempt to recover from the failure is in progress;

wherein the radio link information is received in response to an expiry of a reestablishment initiation timer or an expiry of a reestablishment request timer.

* * * * *